UNITED STATES PATENT OFFICE.

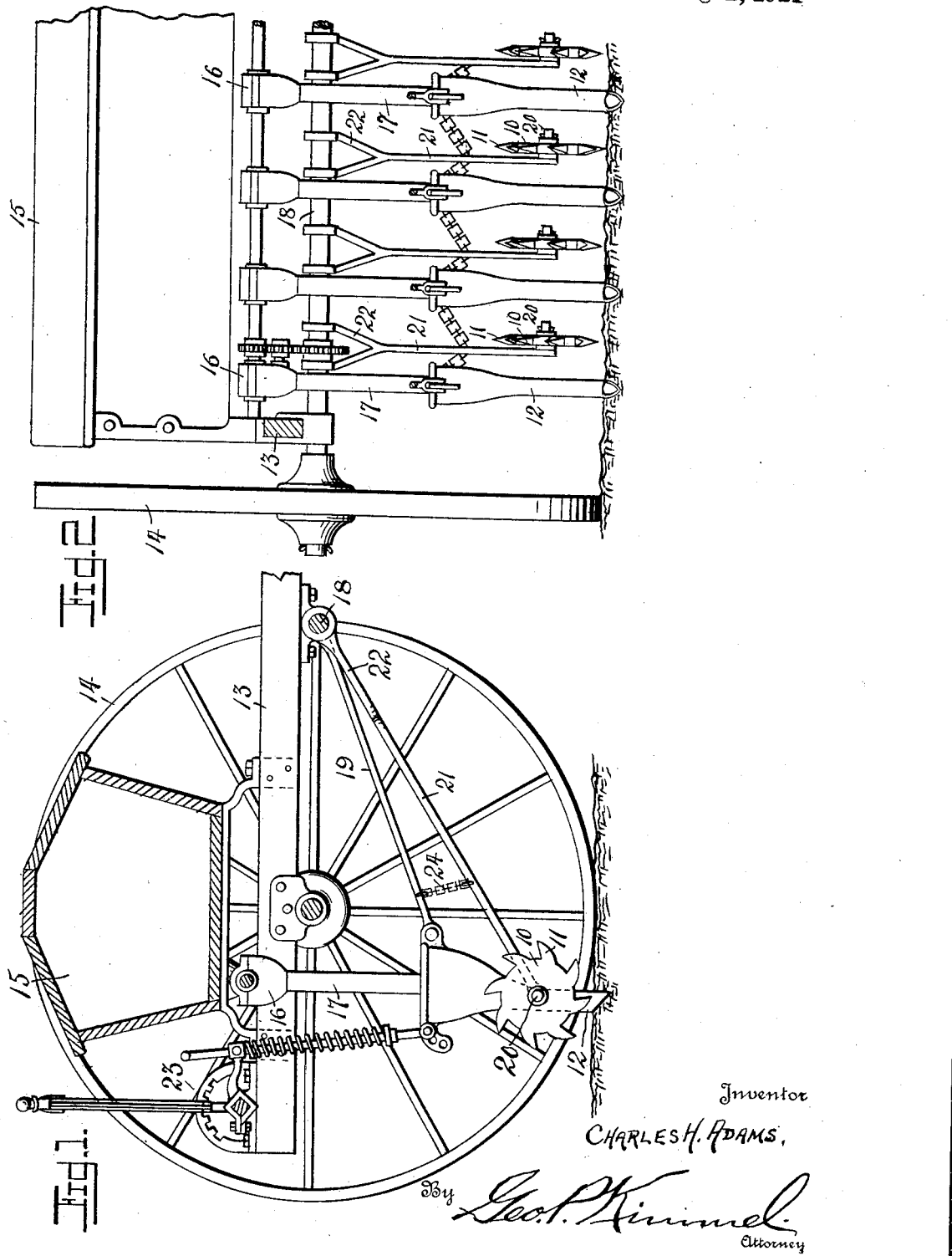

CHARLES HOWARD ADAMS, OF PORTER, PENNSYLVANIA.

WEEDER ATTACHMENT.

1,386,483. Specification of Letters Patent. Patented Aug. 2, 1921.

Application filed January 14, 1920. Serial No. 351,386.

*To all whom it may concern:*

Be it known that I, CHARLES HOWARD ADAMS, a citizen of the United States, residing at Porter, in the county of Jefferson and State of Pennsylvania, have invented certain new and useful Improvements in Weeder Attachments, of which the following is a specification.

This invention relates to that class of agricultural implements in which ground disintegrating or furrow opening devices are employed, such as some forms of harrows, cultivators, seeders and the like, which have a tendency to collect weeds, trash, clods, the stumps of corn stalks, and similar material in front of the ground engaging device, and has for one of its objects to provide a simply constructed attachment for devices of this character whereby they may be readily relieved of such obstructing matter as fast as gathered.

Another object of the invention is to provide an attachment of this character which may be applied to various forms of implements without material structural change either in the implement or the attachment.

With these and other objects in view, the invention consists in certain novel features of construction as hereinafter shown and described and then specifically pointed out in the claims, and in the drawings illustrative of the preferred embodiment of the invention.

Figure 1 is a side elevation partly in section of a portion of a conventional grain drill of the drag shoe type with the improved attachment applied.

Fig. 2 is a rear elevation of the parts shown in Fig. 1, except the shoe adjusting rock shaft and lever.

The improved device comprises a drum or disk 10 of any required diameter and thickness and having a plurality of teeth 11 radiating from its rim, the teeth being pointed at their free ends and preferably directed tangentially to the periphery of the body of the drum and with one edge curved, as shown.

The toothed drum is provided with a central bore to enable it to be mounted for rotation and suspended by any suitable means to enable it to rotate as it is drawn over the ground.

When employed in connection with a grain drill or seeder, as shown in Figs. 1 and 2, one of the toothed drums will generally be located for operation between each pair of the drag shoes, represented at 12, but any required number may be employed, as required.

The supporting frame of the drill is represented at 13, one of the carrier wheels at 14, the seed box at 15, the seed distributers at 16, the seed tubes at 17, the shoe carrier at 18, and the connecting rods between the shoes and carrier at 19.

The journals 20 of the drums 10 are rotatively mounted in the rear ends of connecting rods 21, while the forward ends of the rods are swingingly coupled to the carrier 18 preferably by forked portions 22.

By this means the toothed drums are free to rotate at the rear ends of the rods 21 and will be thus rotated by the contact of the teeth with the ground as the machine is moved forwardly.

The supports 21—22 for the drums are preferably coupled to the rods 19 so as to be elevated with the shoes when the latter are elevated by the lifting mechanism represented conventionally at 23, for instance by chains 24, so that the free lateral play of the shoes is not interfered with.

The rods 21 will be of sufficient length to hold the toothed drums in proper position relative to the shoes 12 so that as the machine is moved forwardly the teeth of the drum will effectually remove any trash which may be gathered by the shoes, and carry it to the rear and thus prevent clogging of the shoes.

One edge of each of the teeth 11 is curved, as shown, and the teeth formed with the proper slant to consecutively engage the ground in a nearly horizontal position and with a downward pressure, and to rise and be released from the ground in a substantially vertical and pendant position. Then as the drum is rotated by the contact of the teeth with the ground, or against and over the weeds, straw charged manure trash, clods or other obstructions which may be gathered by the shoes in their forward movement, the teeth will effectually clear the shoes and themselves as they pass over the obstructions.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. In a device of the class described, a carrying frame, a support carried by the frame, seed dropping shoes in spaced relation, radius bars forked at one end and swinging by the forked portion upon said support and prevented thereby from lateral displacement, said radius bars being directed respectively toward the spaces between the shoes, a toothed drum mounted for free rotation upon each radius bar, and means for simultaneously adjusting said shoes and the radius bars and drums carried thereby, vertically.

2. In a device of the class described, a carrying frame, a support carried by the frame, seed dropping shoes in spaced relation, pull rods coupled respectively to said shoes and to said support, radius bars swinging upon said support and directed respectively toward the spaces between the shoes, a toothed drum mounted for free rotation upon each of said radius bars, flexible means connecting the pull rods and the radius bars to cause the drums to be vertically adjustable simultaneously with the shoes and likewise to permit vertical movement of the drums independently of the shoes.

In testimony whereof, I affix my signature hereto.

CHARLES HOWARD ADAMS.